(12) United States Patent
Wang et al.

(10) Patent No.: US 12,105,030 B2
(45) Date of Patent: Oct. 1, 2024

(54) AUTOMATIC DETECTING DEVICE FOR DETECTING FLAWS ON SURFACE OF CAMSHAFT

(71) Applicant: ZHEJIANG NORMAL UNIVERSITY, Jinhua (CN)

(72) Inventors: Dongyun Wang, Jinhua (CN); Xiangxiang Wang, Jinhua (CN); Chungeng Zhu, Jinhua (CN); Jinjun Shao, Jinhua (CN); Xiang Sun, Jinhua (CN)

(73) Assignee: ZHEJIANG NORMAL UNIVERSITY, Jinhua (CN)

( * ) Notice: Subject to any disclaimer, the term of this patent is extended or adjusted under 35 U.S.C. 154(b) by 243 days.

(21) Appl. No.: 17/947,124

(22) Filed: Sep. 18, 2022

(65) Prior Publication Data
US 2023/0116319 A1    Apr. 13, 2023

(30) Foreign Application Priority Data
Sep. 30, 2021   (CN) .......................... 202111156842.2

(51) Int. Cl.
*G01N 21/952*    (2006.01)
(52) U.S. Cl.
CPC ................................. *G01N 21/952* (2013.01)
(58) Field of Classification Search
CPC ... G01N 21/952; G01N 21/9515; G01N 21/01
See application file for complete search history.

(56) References Cited

U.S. PATENT DOCUMENTS

| 2014/0320638 A1* | 10/2014 | Lee | ...................... G06T 7/0004 348/128 |
| 2015/0300994 A1* | 10/2015 | Yamaji | ................. G01N 29/225 73/618 |
| 2020/0064277 A1* | 2/2020 | Hucker | .............. G01N 21/9515 |

FOREIGN PATENT DOCUMENTS

| CN | 110355383 A | 10/2019 |
| CN | 111024727 A | 4/2020 |
| KR | 20130050421 A | 5/2013 |

OTHER PUBLICATIONS

China Office Action of CN202111156842.2.

* cited by examiner

*Primary Examiner* — Hung V Nguyen

(57) ABSTRACT

The present disclosure relates to an automatic detecting device for detecting flaws on a surface of a camshaft in the field of detecting device. The automatic detecting device includes a framework, which is provided with a working platform, an elevator mechanism, a first rotating elevator mechanism and a second rotating elevator mechanism. The working platform is rotatably connected with the rotating platform. The working platform is provided with a first working position; a second working position, a third working position and a fourth working position. The rotating platform is provided with a plurality of locating members. The locating member is configured for placing a test piece. The working platform is provided with an overturning mechanism, a first visual module and a second visual module.

20 Claims, 11 Drawing Sheets

AUTOMATIC DETECTING DEVICE FOR DETECTING FLAWS ON SURFACE OF CAMSHAFT

CROSS-REFERENCE TO RELATED APPLICATION

This application claims all benefits accruing from China Patent Application No. 202111156842.2, filed on Sep. 30, 2021, and titled "AUTOMATIC DETECTING DEVICE FOR DETECTING FLAWS ON SURFACE OF CAMSHAFT AND METHOD FOR DETECTING SAME", in the China National Intellectual Property Administration, the content of which is hereby incorporated by reference.

TECHNICAL FIELD

The present disclosure relates to detecting devices, in particular, to an automatic detecting device for detecting flaws on a surface of a camshaft.

BACKGROUND

Flaws on a surface of a camshaft can be artificially detected. However, detection efficiency is low and a detection effect is worse. Therefore, there is an urgent need for an automatic detecting device.

SUMMARY

An automatic detecting device for detecting flaws on a surface of a camshaft is provided according to embodiments of the present disclosure.

The automatic detecting device for detecting flaws on a surface of a camshaft includes a framework, and a working platform mounted on the framework. The working platform includes a main working platform and a fixed platform, and the fixed platform includes a fixed platform plate, a fixed platform support and a fixed platform baseboard connected in sequence from top to bottom, and the fixed platform plate is disposed above the main working platform.

The main working platform is provided with a first working position, a second working position, a third working position and a fourth working position, and a first through hole, a second through hole, and a third through hole are disposed at the second working position, the third working position and the fourth working position on the main working platform of the main working platform, respectively.

A rotating platform can be rotatably connected to the working platform, wherein the rotating platform is disposed between the fixed platform plate and the main working platform, the fixed platform support extends through a center hole of the rotating platform, and a gap is provided between the fixed platform support and an inner wall of the center hole. A fourth through hole, a fifth through hole, a sixth through hole and a seventh through hole are provided at positions of the rotating platform corresponding to the second working position, the third working position, the fourth working position and the first working position, respectively.

A first rotating elevator mechanism can be mounted on the framework, wherein the first rotating elevator mechanism successively extends through the first through hole and the fourth through hole corresponding to the second working position, and is configured to elevate and rotate a test piece placed at the second working position.

A first visual module can be mounted on the working platform, which is configured for shooting surface morphologies of the test piece placed at the second working position. The first visual module includes a first illumination member, a second illumination member, a third illumination member, a first camera, a second camera, a third camera and a fourth camera. The first illumination member is disposed at an external side of the second working position, the second illumination member is disposed at an internal side of the second working position, and the third illumination member is disposed above the second working position. The third illumination member includes an inner circle-shaped light and an outer circle-shaped light, the inner circle-shaped light and the outer circle-shaped light are coaxially disposed, the inner circle-shaped light is disposed inside the outer circle-shaped light, and a center point of the inner circle-shaped light and a center point of the fourth through hole are located along a first circumference. The first camera is disposed above a hollow portion of the inner circle-shaped light and towards the second working position, the second camera is located above a gap between the inner circle-shaped light and the outer circle-shaped light and towards the second working position, the third camera is disposed at the external side of the second working position and towards the second working position, and the fourth camera is disposed at the internal side of the second working position and towards the second working position.

An elevator mechanism can be mounted on the framework, wherein the elevator mechanism successively extends through the second through hole and the fifth through hole corresponding to the third working position and is configured for elevating a test piece placed at the third working position.

An overturning mechanism can be mounted on the working platform, wherein the overturning mechanism is configured for overturning the test piece placed at the third working position.

A second rotating elevator mechanism can be mounted on the framework, wherein the second rotating elevator mechanism successively extends through the third through hole and the sixth through hole corresponding to the fourth working position, and is configured to elevate and rotate a test piece placed at the fourth working position.

A second visual module can be mounted on the working platform, and configured for shooting surface morphologies of the test piece placed at the fourth working position. The second visual module includes a fourth illumination member, a fifth illumination member, a fifth camera, a sixth camera and a seventh camera. The fourth illumination member is disposed at an external side of the fourth working position, the fifth illumination member is disposed above the fourth working position. The fifth illumination member is a three-color light set including a first circle-shaped light, a second circle-shaped light and a third circle-shaped light, the first circle-shaped light, the second circle-shaped light and the third circle-shaped light are successively disposed in sequence from top to bottom, and the first circle-shaped light, the second circle-shaped light and the third circle-shaped light are coaxially disposed inside out. The fifth camera is disposed at the external side of the fourth working position and towards the fourth working position, the sixth camera is disposed at an internal side of the fourth working position and towards the fourth working position, and the seventh camera is disposed above a hollow portion of the first circle-shaped light and towards the fourth working position.

A plurality of locating members disposed on the rotating platform, and configured for placing the test piece.

In some embodiments, the main working portion is provided with a hollow rotating table including a fixed portion and a rotating portion. The fixed platform baseboard is connected to the fixed portion of the hollow rotating table. The rotating platform is connected to the rotating portion of the hollow rotating table. The rotating portion of the hollow rotating table is connected to a power output end of a closed-loop stepping motor.

In some embodiments, the first working position is provided with a diffuse reflection sensor at a center of the first working position. The diffusion reflection sensor is configured for detecting whether there is a test piece placed at the first working position. The first through hole, the second through hole and the third through hole are disposed at a center of the second working position, a center of the third working position and a center of the fourth working position, respectively. The center of the first working position, the center of the second working position, the center of the third working position and the center of the fourth working position are located along a second circumference, and the first working position, the second working position, the third working position and the fourth working position are disposed along the second circumference.

In some embodiments, the rotating platform is provided with an arc-shaped groove. The arc-shaped groove is provided with a bolt. The working platform is provided with an inductive sensor. A distance between the inductive sensor and a center of rotation of the rotating platform is defined as h1, an diameter of a third circumference in which the arc-shaped groove locates is defined as r1, and h1 equals to r1.

In some embodiments, the elevator mechanism includes a first lifting cylinder and a lifting support. A cylinder body of the first lifting cylinder is connected to the framework, a piston end of the first lifting cylinder is connected to a bottom end of the lifting support, and the lifting support is a hollow structure.

In some embodiments, both the first rotating elevator mechanism and the second rotating elevator mechanism include a second lifting cylinder, a stepping motor, a slider and a slide rail, respectively. A cylinder body of the second lifting cylinder is connected to the framework, a piston end of the second lifting cylinder is connected to a motor body of the stepping motor, the motor body of the stepping motor is connected to the slider, the slide rail is connected to the framework, and the slider is slidably connected to the slide rail. A power output end of the stepping motor of the first rotating elevator mechanism is connected to a first autorotation support, and the first autorotation support is provided with a first locating hole. A power output end of the stepping motor of the second rotating elevator mechanism is connected to a second autorotation support, and the second autorotation support is provided with a second locating hole.

In some embodiments, the overturning mechanism includes a rotary cylinder, a first cylinder, a first finger portion and a second finger portion. A cylinder body of the rotary cylinder is connected to the working platform. A rotary portion of the rotary cylinder is connected to a cylinder body of the first cylinder. The first finger portion and the second finger portion are connected to two pistons of the first cylinder, respectively.

In some embodiment, the automatic detecting device further includes a first fixed plate. The first illumination member includes two first light bars and two first supports. The two first light bars are rectangle-shaped. The two supports have a dovetail tenon, respectively. The two first supports are disposed on the main working platform. The third camera is slidably disposed on one of the two first supports, and the two first light bars are slidably disposed on the other one of the two first supports. Bottoms of the two supports are fixed to the main working platform via the first fixed plate, and the two first supports are slidably connected to the first fixed plate.

In some embodiment, distances between centers of the two first supports and a center of the second working position are 210 mm. A length direction of the main working platform is defined as a horizontal direction, an angle between the first fixed plate and the horizontal direction is 35 degrees.

In some embodiment, the automatic detecting device further includes a second fixed plate. The second illumination member includes two second light bars and two second supports. The two second light bars are rectangle-shaped. The fourth camera is slidably disposed on one of the two second supports, and the two second light bars are slidably disposed on the other one of the two second supports. Bottoms of the two second supports are fixed to the fixed platform plate via the second fixed plate, and the two second supports are slidably connected to the second fixed plate.

In some embodiments, distances between centers of the two second supports and a center of the fixed platform plate are 20 mm. A length direction of the main working platform is defined as a horizontal direction, an angle between the second fixed plate and the horizontal direction is 30 degrees.

In some embodiments, the automatic detecting device further includes a third support, which has a dovetail tenon. The third support is disposed on the main working platform. The outer circle-shaped light, the second camera, the first camera, and the inner circle-shaped light are disposed on the third support from top to bottom. The outer circle-shaped light, the second camera, the first camera, the inner circle-shaped light are capable of sliding along the third support.

In some embodiments, upon conditions that a length direction of the main working platform is defined as a horizontal direction, a line defined by a center of the third support and a center of the second working position is parallel to the horizontal direction, and a distance between the center of the third support and the second center of the second working position is 196 mm.

In some embodiments, the automatic detecting device further includes a third fixed plate. The fourth illumination member includes two third light bars and two fourth supports. The two third light bars are rectangle-shaped. The two fourth supports have a dovetail tenon, respectively. The fifth camera is slidably disposed on one of the two fourth supports. The two third light bars are slidably disposed on the other one of the two fourth supports. Bottoms of the two fourth supports are fixed to the main working platform via the third fixed plate. The two fourth supports are slidably connected to the third fixed plate.

In some embodiments, upon conditions that a length direction of the main working platform is defined as a horizontal direction, an angle between the third fixed plate and the horizontal direction is 40 degrees.

In some embodiments, the automatic detecting device further includes a fifth support, which has a dovetail tenon. The fifth support having the dovetail is disposed on the main working platform. The seventh camera and the firth illumination member are disposed on the fifth support from top to bottom. The seventh camera and the firth illumination member are capable of sliding along the fifth support.

In some embodiments, upon conditions that a length direction of the main working platform is defined as a horizontal direction, an angle between the fifth support and the horizontal direction is 60 degrees.

In some embodiments, a distance between centers of the fifth supports and a center of the fourth working portion is 126 mm.

In some embodiments, a sixth support is disposed on the fixed platform plate. The sixth support has a dovetail tenon. The sixth camera is disposed on the sixth support and capable of sliding along the sixth support.

In some embodiments, a distance between a center of the sixth support and a center of the fixed platform plate is 20 mm.

Compared with conventional art, the present disclosure has following advantages: the automatic detecting device for detecting flaws on a surface of a camshaft and a method for detection the same in the present disclosure can comprehensively and automatically detect flaws on the surface of the camshaft. The automatic detecting device and the method in the present disclosure have high degrees of automation, high detecting efficiency and good detecting effect.

BRIEF DESCRIPTION OF THE DRAWINGS

In order to better describe and explain the embodiments and/or examples of those inventions disclosed herein, one or more drawings may be referred to. The additional details or examples used to describe the drawings should not be considered as limiting the scope of any of the disclosed inventions, the currently described embodiments and/or examples, and the best mode of these inventions currently understood.

Figure 1:
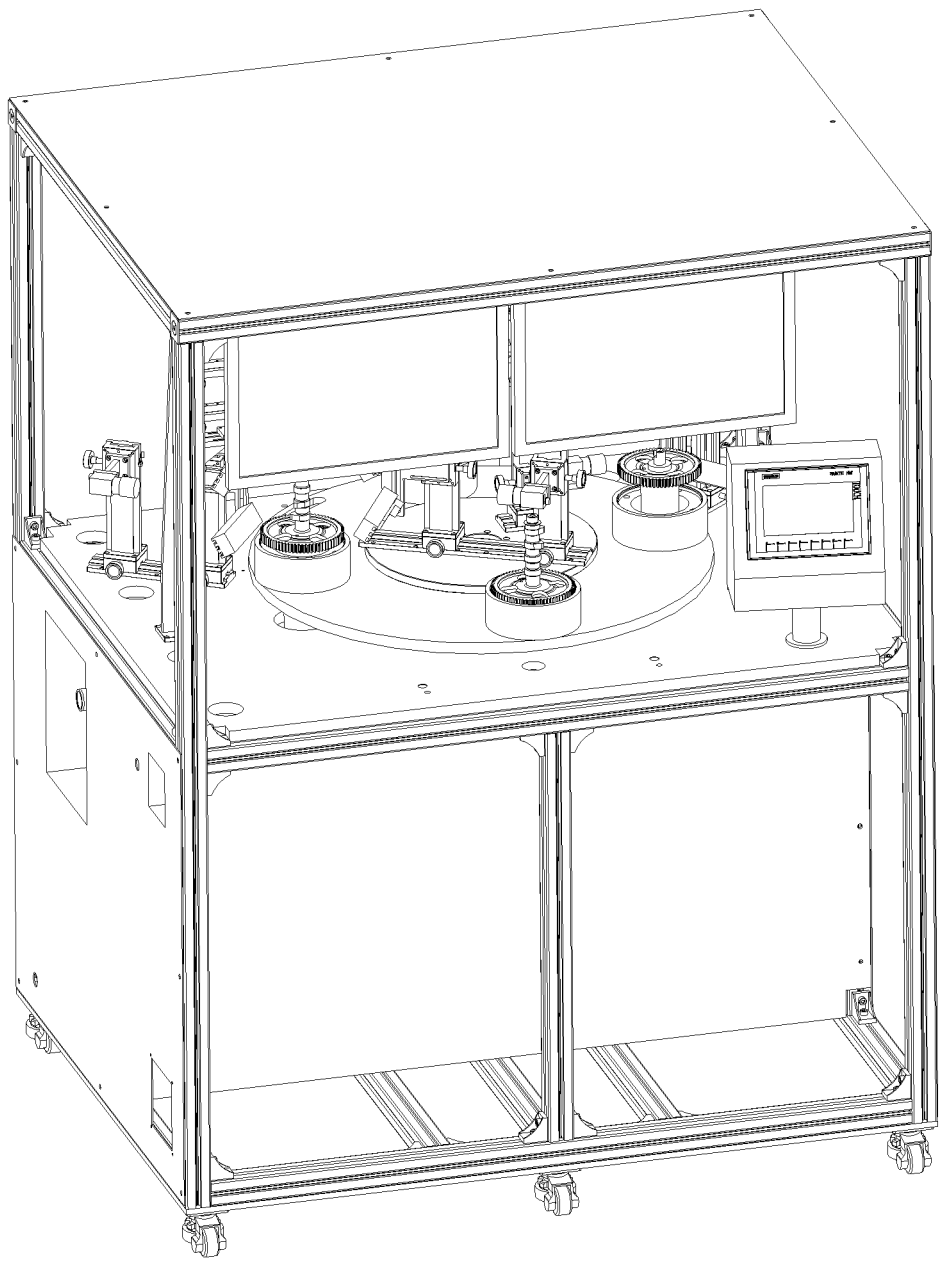
FIG. 1 is a structural schematic diagram of an automatic detecting device for detecting flaws on a surface of a camshaft in an embodiment.

In the figures: 100 represents an automatic detecting device for detecting flaws on a surface of a camshaft; 1 represents a framework; 2 represents a working platform; 3 represents an elevator mechanism; 4 represents a first rotating elevator mechanism; 5 represents a second rotating elevator mechanism; 6 represents a first working position; 7 represents a second working position; 8 represents a third working position; 9 represents a fourth working position; 10 represents a locating member; 11 represents a rotating platform; 12a represents a first through hole; 12b represents a second through hole; 12c represents a third through hole; 13a represents a fourth through hole; 13b represents a second fifth through hole; 13c represents a sixth through hole; 13d represents a seventh through hole; 14 represents a overturning mechanism; 15 represents a first visual module; 16 represents a second visual module; 17 represents a main working platform; 18 represents a fixed platform; 19 represents a fixed platform plate; 20 represents a fixed platform support; 21 represents a fixed platform baseboard; 22 represents a hollow rotating table; 23 represents a diffusion reflection sensor; 24 represents an arc-shaped groove; 25 represents a inductive sensor; 26 represents a first lifting cylinder; 27 represents a lifting support; 28 represents a second lifting cylinder; 29 represents a stepping motor; 30 represents a slider; 31 represents a slide rail; 32 represents a first autorotation support; 33 represents a second autorotation support; 34 represents a rotary cylinder; 35 represents a first cylinder; 37 represents a first finger portion; 38 represents a second finger portion; 39 represents a first illumination member; 40 represents a second illumination member; 41 represents a third illumination member; 42 represents a first camera; 43 represents a second camera; 44 represents a third camera; 45 represents a fourth camera; 46 represents an inner circle-shaped light; 47 represents an outer circle-shaped light; 48 represents a fourth illumination member; 49 represents a fifth illumination member; 50 represents a fifth camera; 51 represents a sixth camera; 52 represents a seventh camera; 53 represents a first circle-shaped light; 54 represents a second circle-shaped light; 55 represents a third circle-shaped light; 56 represents a closed-loop stepping motor; 57 represents a mounting pedestal of cylinder support; 58 represents a supporting pedestal of cylinder; 59 represents a float joint; 60 represents a first connecting plate; 61 represents a second connecting shaft; 62 represents a second connecting plate; 63 represents a connecting shaft; 64 represents a first support; 65 represents a second support; 66 represents a third support; 67 represents a fourth support; 68 represents a fifth support; 69 represents a sixth support; 70 represents a first connecting shaft; 71 represents a first locating hole; 72 represents a second locating hole; 73 represents a support of overturning mechanism; 74 represents a center hole; 75 represents a fixed portion; 76 represents a rotating portion; 200 represents a test piece; 201 represents a first end; 202 represents a second end; 203 represents a first end surface; 204 represents a first sand-casting surface; 205 represents a first side surface of tooth portion; 206 represents a first cam surface; 207 represents a second cam surface; 208 represents a second end surface; 209 represents a second sand-casting surface; 210 represents a second side surface of tooth portion; 211 represents a tooth surface; 212 represents a side surface of keyway; 391 represents a first light bar; 401 represents a second light bar; 481 represents a third light bar; 641 represents a first fixed plate; 651 represents a second fixed plate; and 671 represents a third fixed plate.

DETAILED DESCRIPTION

In order to make to objects, characters and advantages of the present disclosure more clearly understood, the present disclosure will be further described in conjunction with figures and embodiments hereinafter.

Embodiment 1

Figure 2:
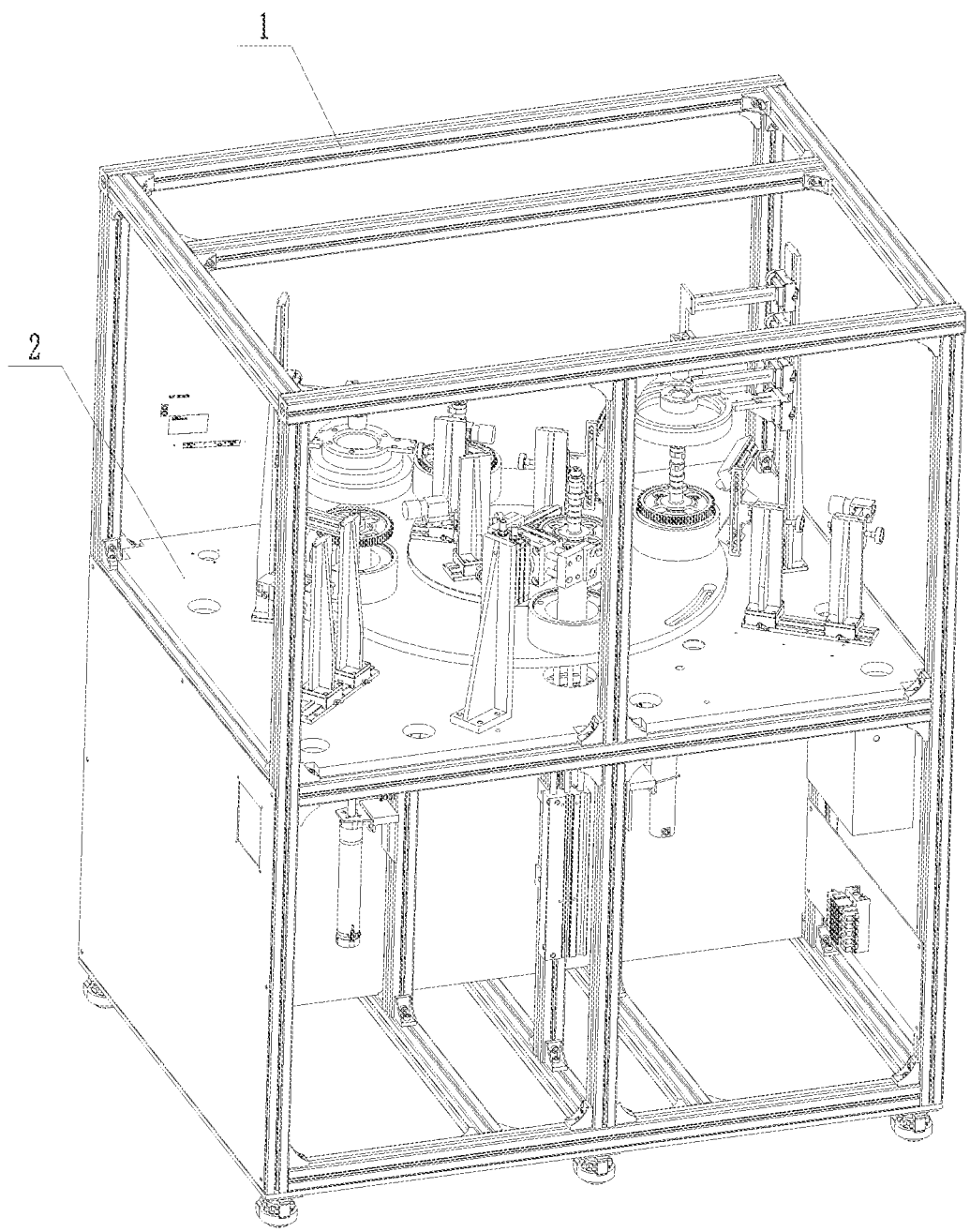
FIG. 2 is a structural schematic diagram of a part of structures of an automatic detecting device for detecting flaws on a surface of a camshaft in an embodiment.
Figure 3:
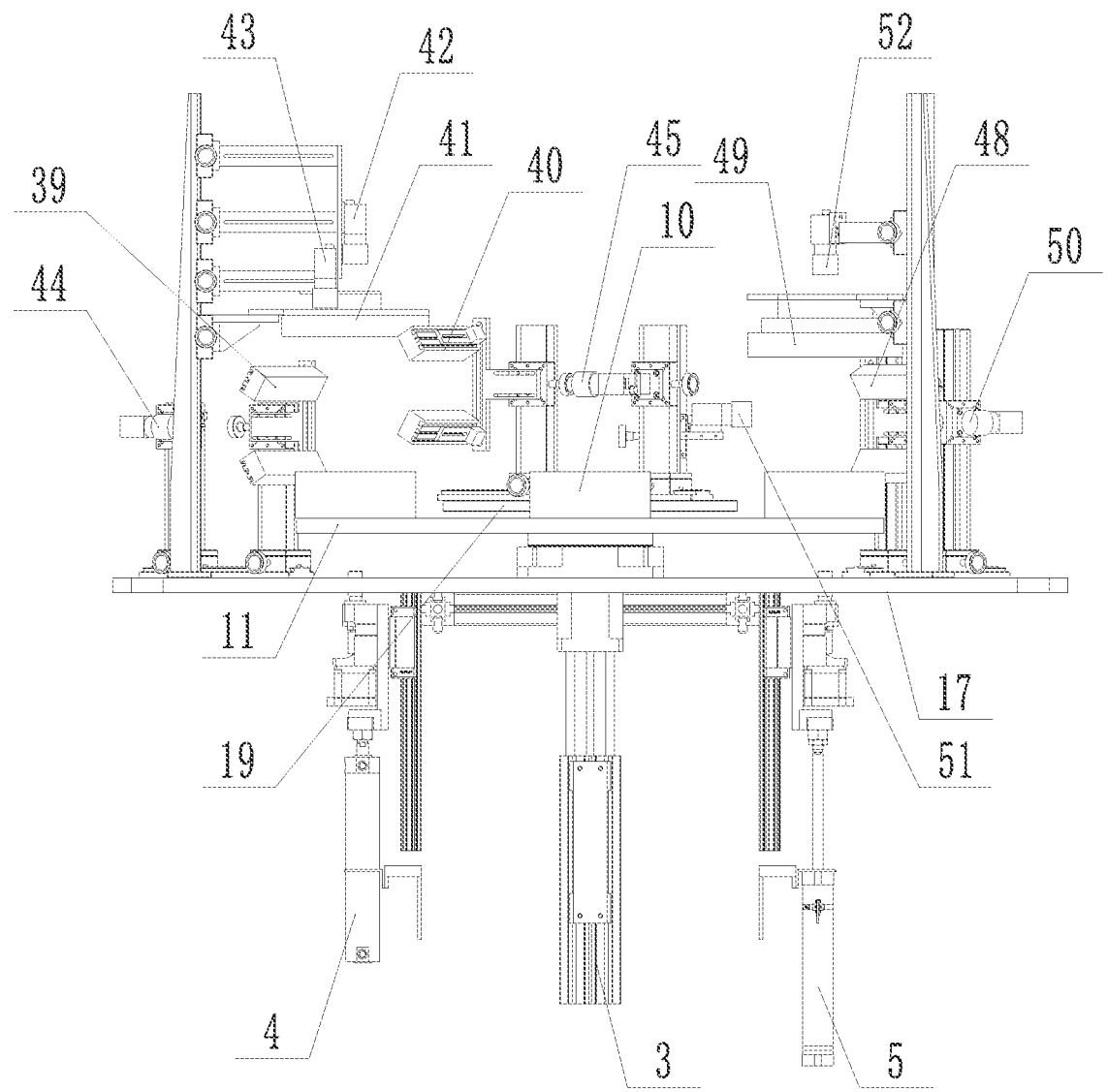
FIG. 3 is a front view of inner structures of an automatic detecting device for detecting flaws on a surface of a camshaft in an embodiment, wherein a framework is omitted.

Referring to FIG. 1 to FIG. 3, the present disclosure provides an automatic detecting device 100 for detecting flaws on a surface of a camshaft, which can include a framework 1, and the framework 1 can be provided with a working platform 2, an elevator mechanism 3, a first rotating elevator mechanism 4 and a second rotating elevator mechanism 5.

Referring to FIG. 3, FIG. 5, FIG. 13 and FIG. 14, the working platform 2 is rotatably connected to a rotating platform 11. The working platform 2 can be provided with a first working position 6, a second working position 7, a third working position 8 and a fourth working position 9. The rotating platform 11 can be provided with a plurality of locating members 10. The plurality of locating members 10 can be configured to place a test piece. A first through hole 12a, a second through hole 12b, and a third through hole 12c can be disposed at the second working position 7, the third working position 8 and the fourth working position 9 of the working platform 2 of the working platform 2, respectively. A fourth through hole 13a, a fifth through hole 13b, a sixth through hole 13c and a seventh through hole 13d can be provided on the rotating platform 11 at positions opposite to the plurality of locating members 10. The fourth through hole 13a can be opposite to the first through hole 12a. The first rotating elevator mechanism 4 can rise and successively extend through the first through hole 12a and the fourth through hole 13a to lift and rotate a test piece placed at the second working position 7. The elevator mechanism 3 can rise and successively extend through the second through hole 12b and the fifth through hole 13b to lift and rotate a test piece placed at the third working position 8. The second rotating elevator mechanism 5 can rise and successively extend through the third through hole 12c and the sixth through hole 13c to lift and rotate a test piece placed at the fourth working position 8.

Figure 4:
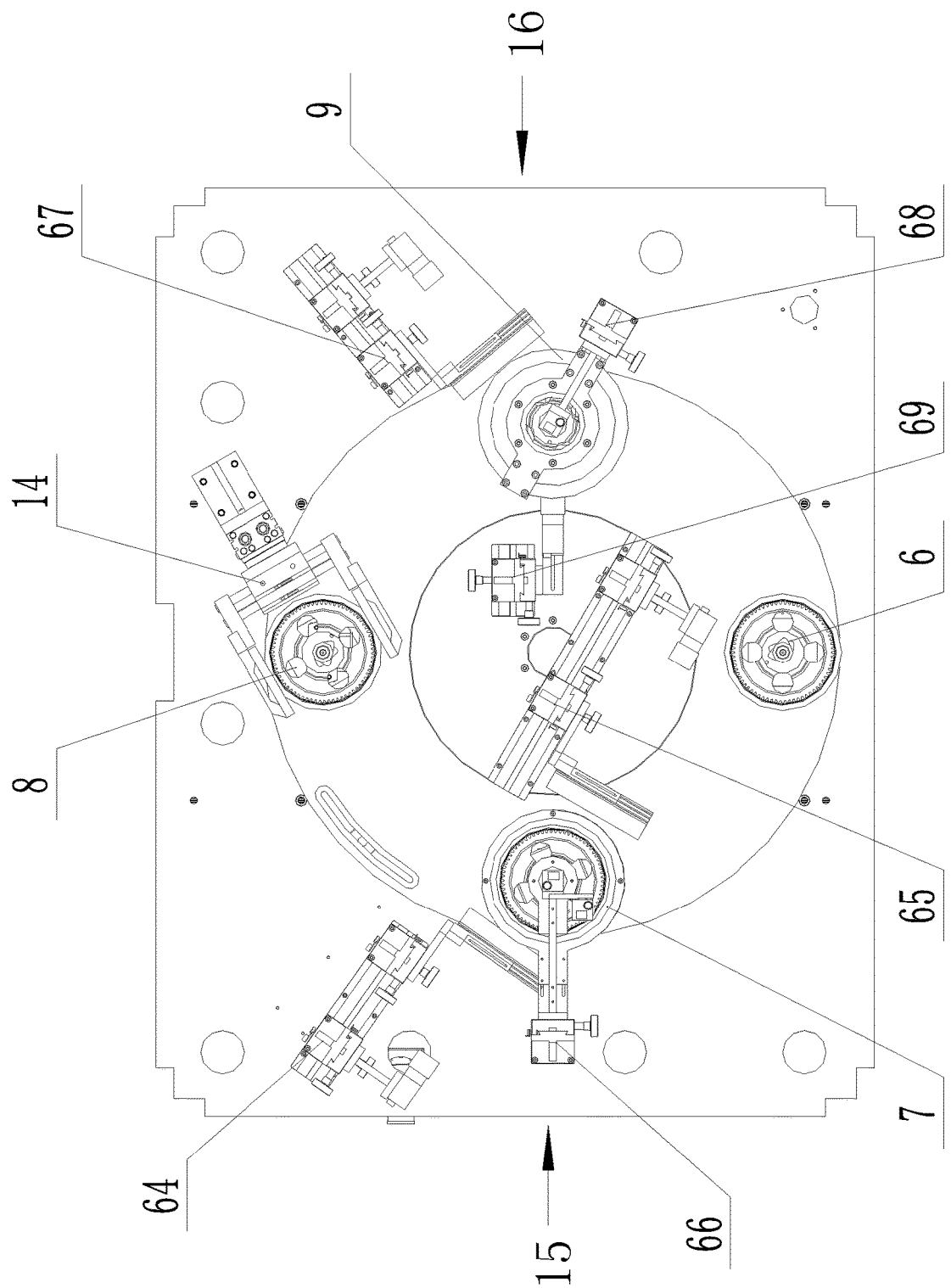
FIG. 4 is a top view of inner structures of an automatic detecting device for detecting flaws on a surface of a camshaft in an embodiment, wherein a framework is omitted.

Referring to FIG. 4, the working platform 2 can be provided with an overturning mechanism 14, a first visual module 15 and a second visual module 16. The overturning mechanism 14 can be configured to invert the test piece 200 placed at the third working position 8. The first visual module 15 can be configured to shoot surface morphologies of the test piece 200 placed at the second working position 7. The second visual module 16 can be configured to shoot surface morphologies of the test piece 200 placed at the fourth working position 9.

Referring to FIG. 2, in the present embodiment, the framework 1 can include a plurality of beams. A framework baseboard can be provided at a bottom of the framework 1, a cover plate can be provided at a top portion of the framework 1, and a lower left side plate, a lower right plate, a front plate and a back plate are disposed at each side of the framework 1. An electrical control mounting plate can be disposed on a lower front beam. A pressure regulating valve, a trigger, a power indicator and a fan can be disposed on the lower left side plate. A fan can be disposed on the lower right side plate. A valve terminal can be disposed on the back side plate, and an indicator light can be disposed on the cover plate.

Figure 14:
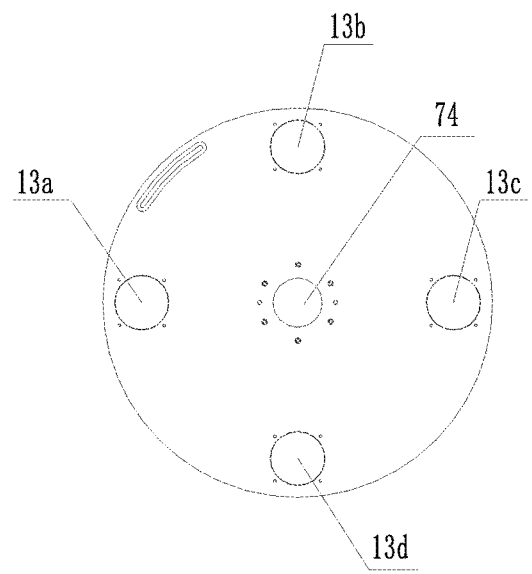
FIG. 14 is a schematic diagram of a rotating platform in an embodiment.
Figure 15:
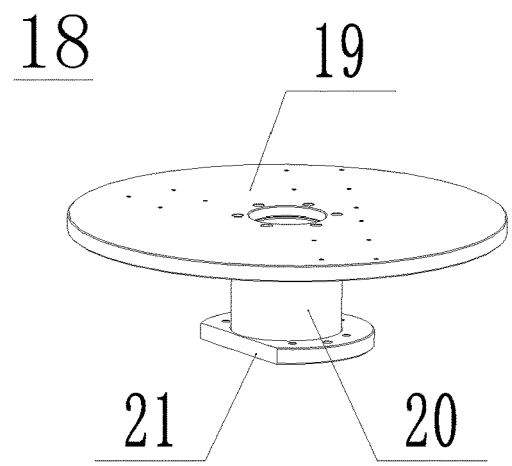
FIG. 15 is a schematic diagram of a fixed platform in an embodiment.

Referring to FIG. 3, FIG. 14 and FIG. 15, in the present embodiment, the working platform can include a main working platform 17 and a fixed platform 18. The fixed platform 18 can include a fixed platform plate 19, a fixed platform support 20 and a fixed platform baseboard 21 connected in sequence from top to bottom, and the fixed platform plate 19 can be disposed above the main working platform 17. The rotating platform 11 can be disposed between the fixed platform plate 19 and the main working platform 17, the fixed platform support 20 can extend through a center hole 74 of the rotating platform 11, and a gap can provided between the fixed platform support 20 and an inner wall of the center hole 74.

Figure 16:
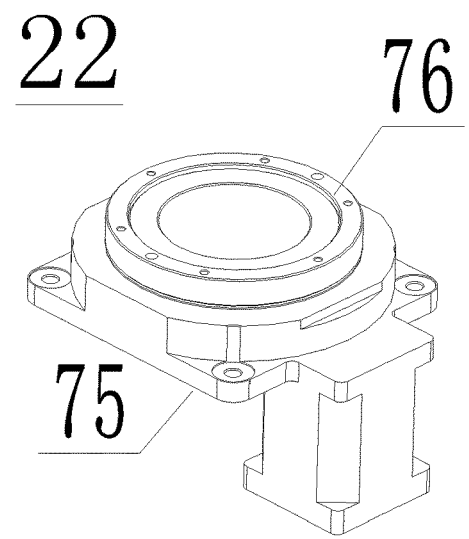
FIG. 16 is a schematic diagram of a hollow rotating table in an embodiment.

Referring to FIG. 16, the main working portion 17 can be provided with a hollow rotating table 22. The hollow rotating table 22 can be a conventional art. The fixed platform baseboard 21 can be connected to a fixed portion 75 of the hollow rotating table 22, the rotating platform 11 can be connected to a rotating portion 76 of the hollow rotating table 22, and the rotating portion 76 of the hollow rotating table 22 can be connected to a power output end of a closed-loop stepping motor 56.

Figure 11:
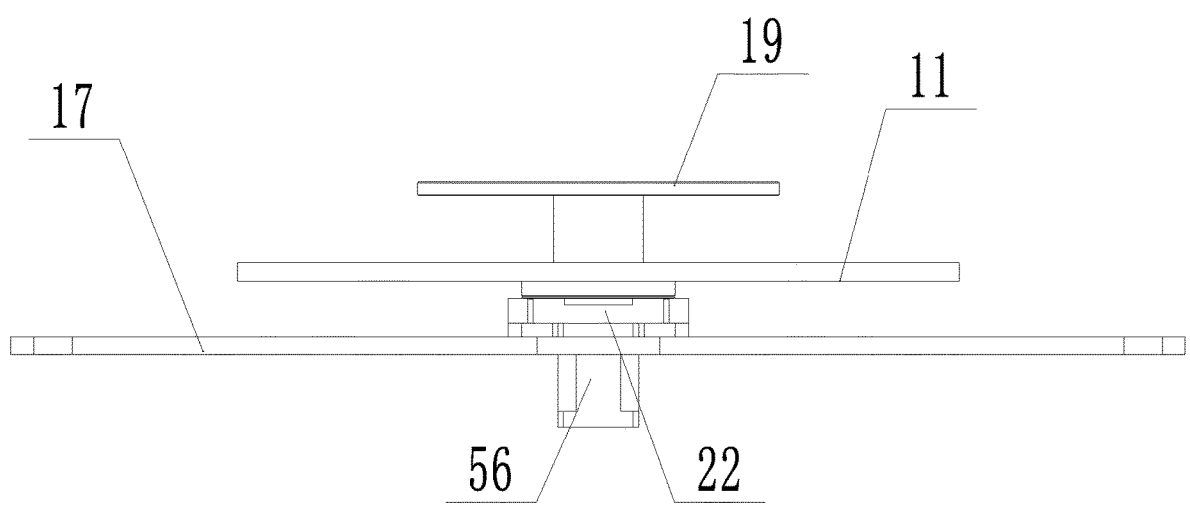
FIG. 11 is a front view of a working platform and a rotating platform in an embodiment.

Referring to FIG. 11 and FIG. 16, in the present embodiment, the closed-loop stepping motor 56 can cooperate with a speed reducer to drive the rotating portion 76 of the hollow rotating table 22 to rotate, thereby driving the rotating platform 11 to rotate relative to the working platform 2.

Figure 13:
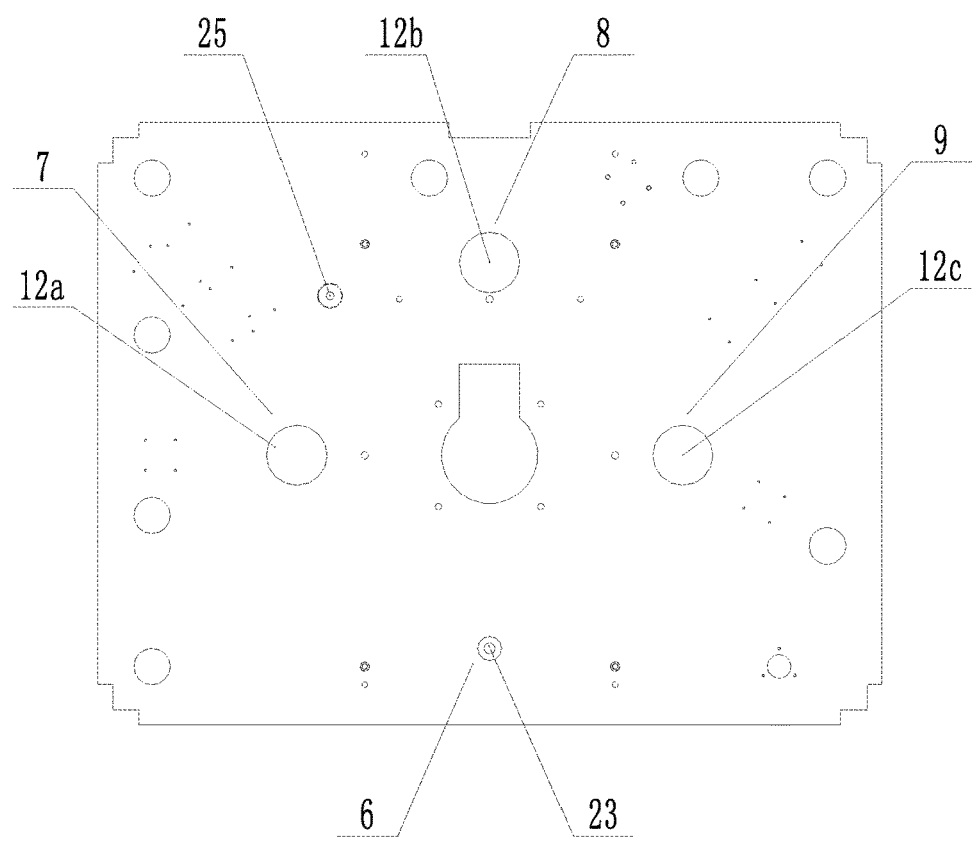
FIG. 13 is a schematic diagram of a main working platform in an embodiment.

Referring to FIG. 13, in the present disclosure, the first working position 6 can be provided with a diffuse reflection sensor 23 at a center of the first working position 6. The diffusion reflection sensor 23 can be configured for detecting whether there is a test piece placed at the first working position 6. The first through hole 12a, the second through hole 12b and the third through hole 12c can be disposed at a center of the second working position 7, a center of the third working position 8 and a center of the fourth working position 9, respectively. The center of the first working position 6, the center of the second working position 7, the center of the third working position 8 and the center of the fourth working position 9 can be located along a second circumference. The first working position 6, the second working position 7, the third working position 8 and the fourth working position 9 can be uniformly disposed along the second circumference. That is, radians between the center of the first working position 6 and the center of the second working position 7, between the center of the second working position 7 and the center of the third working position 8, between the center of the third working position 8 and the center of the fourth working position 9, and between the first working position 6 and the center of the fourth working position 9 along the second circumference are 90 degrees, respectively.

Figure 12:
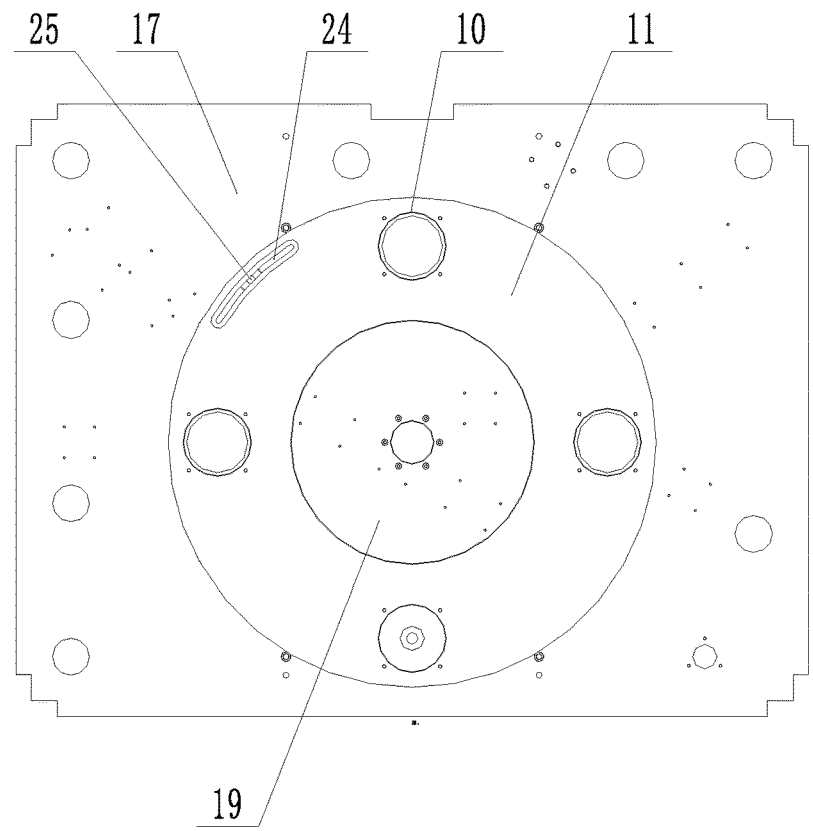
FIG. 12 is a top view of a working platform and a rotating platform in an embodiment.

Referring to FIG. 12, in the present embodiment, the rotating platform 11 can be provided with an arc-shaped groove 24. The arc-shaped groove 24 can be provided with a bolt detachably disposed in the arch-shaped groove 24. The working platform 17 can be provided with an inductive sensor 25. A distance between the inductive sensor 25 and a center of rotation of the rotating platform 11 can be defined as h1, a diameter of a third circumference in which the arc-shaped groove 24 is located can be defined as r1, and h1 can be equal to r1. The bolt and the inductive sensor 25 can be configured for zero returning of the closed-loop stepping motor 56. A process of zero return has been disclosed in the related art. In some embodiments, using an auto zero returning module of s7-1200PLC, and controlling the actuator by impulse to actuate zero returning command, so that the closed-loop stepping motor 56 can drive the rotating platform 11 to uniformly move. When a bolt of the rotating platform 11 moves to an edge of the inductive sensor 25, the zero point signal can be set, the closed-loop stepper motor 56 can perform a preset low-speed reciprocating motion, and finally complete the zero return command.

Figure 6:
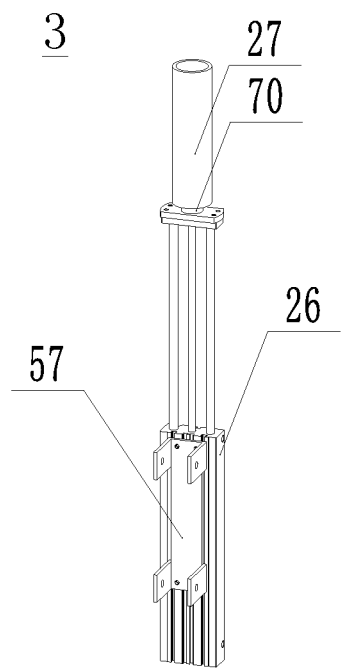
FIG. 6 is a schematic diagram of an elevator mechanism in an embodiment.
Figure 7:
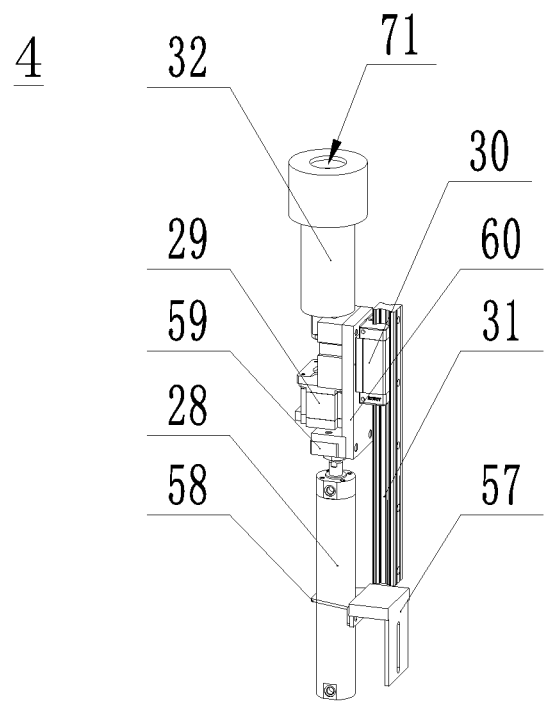
FIG. 7 is a schematic diagram of a first rotating elevator mechanism in an embodiment.
Figure 8:
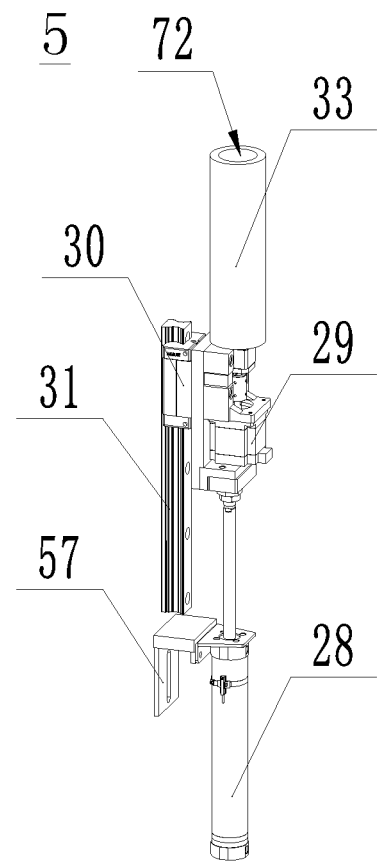
FIG. 8 is a schematic diagram of a second rotating elevator mechanism in an embodiment.
Figure 9:
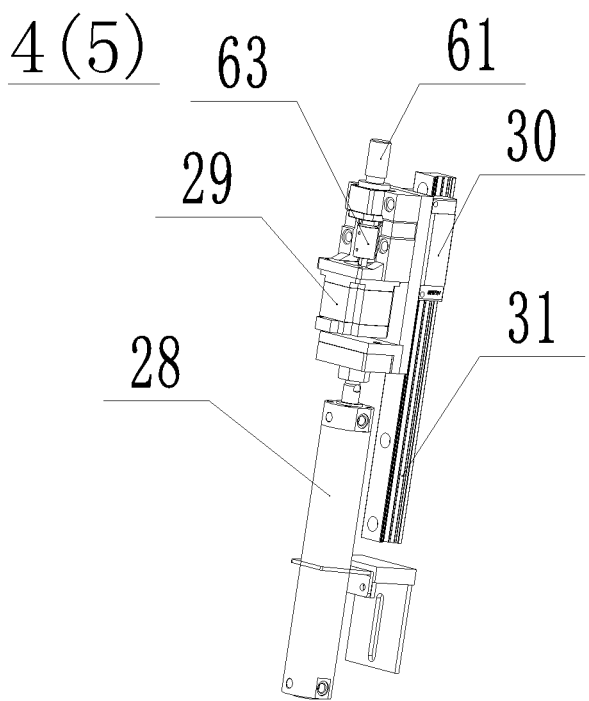
FIG. 9 is a partial structural schematic diagram of a first rotating elevator mechanism/a second rotating elevator mechanism in an embodiment.

Referring to FIG. 2 and FIG. 6, in the present embodiment, the elevator mechanism 3 can include a first lifting cylinder 26 and a lifting support 27. A cylinder body of the first lifting cylinder 26 can be connected to the framework 1 via a mounting pedestal of cylinder support 57, and a piston end of the first lifting cylinder 26 can be connected to a bottom end of the lifting support 27 via a first connecting shaft 70. In some embodiment, one end of the first connecting shaft 70 is connected to the piston end of the first lifting cylinder 26, and the other end of the first connecting shaft can be threadedly connected to the bottom end of the lifting support 27. The lifting support 27 is in a cylinder-shaped structure, and the lifting support 27 can be a hollow structure. Sizes of the hollow structure can match with two ends of the camshaft (that is, a first end 201 and a second end 202).

Referring to FIG. 2, FIG. 7, FIG. 8 and FIG. 9, in the present embodiment, both the first rotating elevator mechanism 4 and the second rotating elevator mechanism 5 can include a second lifting cylinder 28, a stepping motor 29, a slider 30 and a sidle rail 31. The cylinder body of the second lifting cylinder 28 is connected to the framework 1 via a mounting pedestal of cylinder support, the cylinder body of the second lifting cylinder 28 can be connected to the mounting pedestal of cylinder support via a supporting pedestal of cylinder 58.

A piston end of the second lifting cylinder 28 can be connected to a float joint 59, the float joint 59 can be connected to the slider 30 via a first connecting plate 60. A motor body of the stepping motor 29 can be connected to the first connecting plate 60. The slide rail 31 can be connected to the framework 1. The slider 30 can be slidably connected to the slide rail 31.

A power output end of the stepping motor 29 of the first rotating elevator mechanism 4 can be connected to a first autorotation support 32 via a second connecting shaft 61. One end of the second connecting shaft 61 can be connected to the power output end of the stepping motor 29 of the first rotating elevator mechanism 4 via a connecting shaft 63. The other end of the second connecting shaft 61 can be threadedly connected to a bottom end of the first autorotation support 32. The first autorotation support 32 can be in step-type cylinder-shaped, that is, the first autorotation support 34 can be consisted of two cylinders with different diameters, wherein an upper cylinder can have a larger diameter, and the lower one can have a smaller cylinder. An upper end of the first autorotation support 32 can be provided with a first locating hole 71. A shape of the first locating hole can match a first end of the camshaft (which can be a first end 201 in the present embodiment). In the present embodiment, the first locating hole 71 can be a taper-shaped hole.

A power output end of the stepping motor 29 of the second rotating elevator mechanism 5 can be connected to a second autorotation support 33 via a second connecting shaft 61. One end of the second connecting shaft 61 can be connected to the power output end of the stepping motor 29 of the second rotating elevator mechanism 5 via a connecting shaft 63. The other end of the second connecting shaft 61 can be threadedly connected to a bottom end of the second autorotation support 33. The second autorotation support 33 can be in cylinder-shaped. An upper end of the second autorotation support 33 can be provided with a second locating hole 72. A shape of the second locating hole can match a second end of the camshaft (which can be a second end 202 in the present embodiment).

In the present embodiment, when the camshaft is upright disposed, a contact area between the camshaft and the first autorotation support 32 is relatively small; and when the camshaft is disposed upside-down, a contact area between the camshaft and the second autorotation support 33 is relatively large. Therefore, a size of the second autorotation support 33 can be larger than that of the first autorotation support 32.

Figure 10:
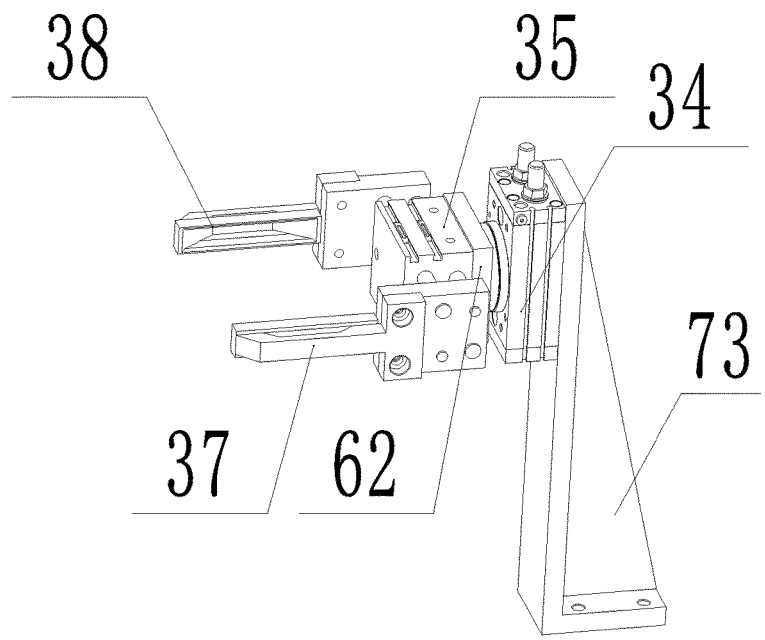
FIG. 10 is a schematic diagram of an overturning mechanism in an embodiment.

Referring to FIG. 10, in the present embodiment, the overturning mechanism 14 can include a rotary cylinder 34, a first cylinder 35, a first finger portion 37 and a second finger portion 38. A cylinder body of the rotary cylinder 34 can be connected to the working platform 2 via a support 73 of overturning mechanism. A rotary portion of the rotary cylinder 34 can be connected to a cylinder body of the first cylinder 35 via a second connecting plate 62. The first finger portion 37 and the second finger portion 38 can be connected to two pistons of the first cylinder 35, respectively. The first finger portion 37 can be parallel to the second finger portion 38. The first cylinder 35 can be configured to drive the first finger portion 37 and the second finger portion to clamp or release the test piece 200. The rotary cylinder 35 can drive the first finger portion 37 and the second finger portion 38 to invert, thereby overturning the test piece 200. It could be understood that two cylinders can be applied to drive the first finger portion 37 and the second finger portion 38, respectively.

Figure 5:
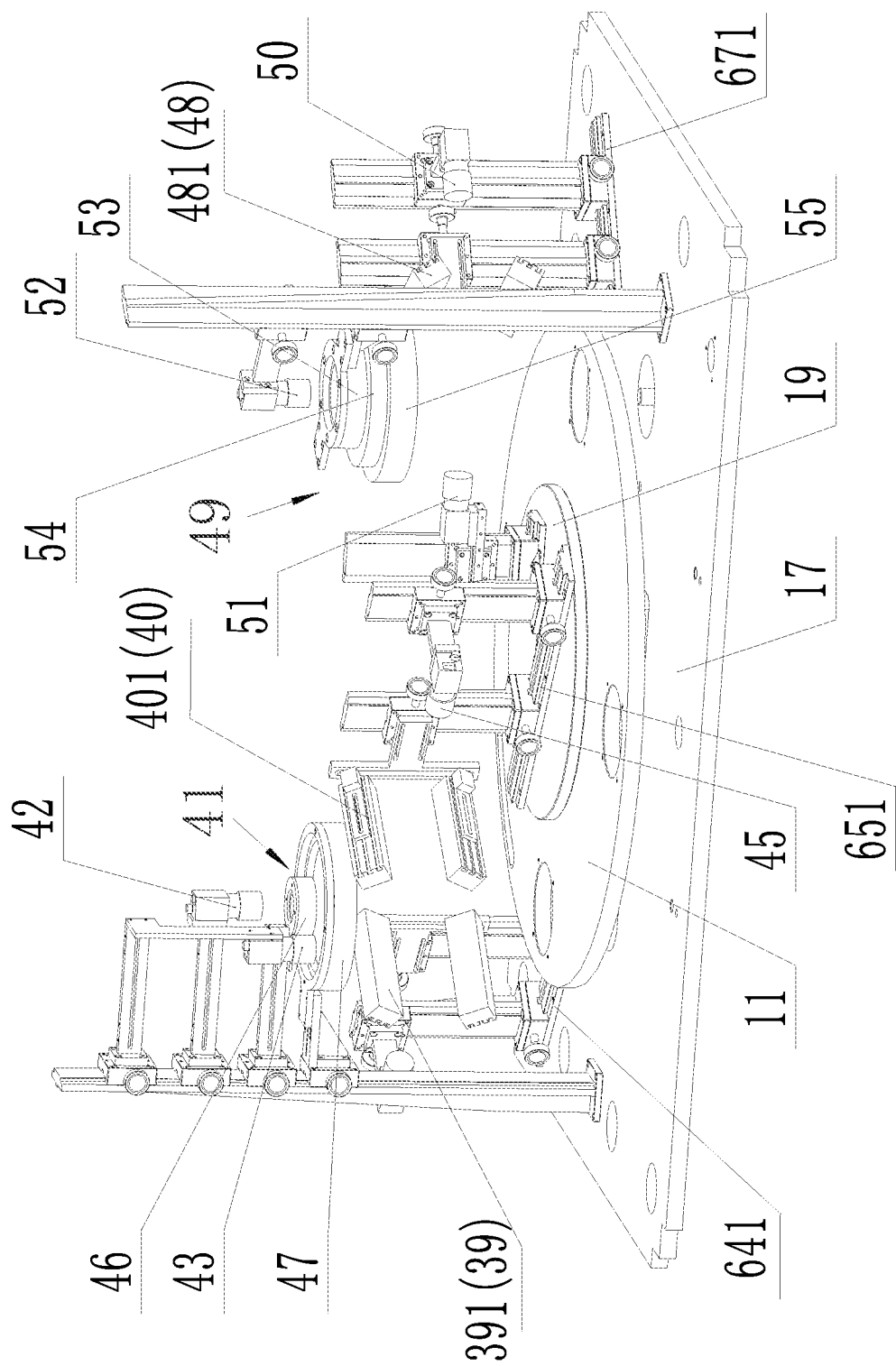
FIG. 5 is a partial structural schematic diagram of an automatic detecting device for detecting flaws on a surface of a camshaft in an embodiment.

Referring to FIG. 3, FIG. 4 and FIG. 5, in the present embodiment, the first visual module 15 can include a first illumination member 39, a second illumination member 40, a third illumination member 41, a first camera 42, a second camera 43, a third camera 44 and a fourth camera 45.

The first illumination member 39 can be disposed on a main working platform 17 at an external side of the second working position 7. The second illumination member 40 can be disposed on a fixed platform 19 at an internal side of the second working position 19. The third illumination member 41 can be disposed above the second working position 7. The third illumination member 41 can include an inner circle-shaped light 46 and an outer circle-shaped light 47. The inner circle-shaped light 46 and the outer circle-shaped light 47 can be coaxially disposed, and the inner circle-shaped light 46 can be disposed inside the outer circle-shaped light 47. A center point of the inner circle-shaped light 46 and a center point of the fourth through hole 13a can be located along a first circumference.

The first camera 42 can be disposed above a hollow portion of the inner circle-shaped light 46 and towards the second working position 7. The second camera 43 can be located above a gap between the inner circle-shaped light 46 and the outer circle-shaped light 47 and towards the second working position 7. The third camera 44 can be disposed at the external side of the second working position 7 and towards the second working position 7. The fourth camera 45 can be disposed at the internal side of the second working position 7 and towards the second working position 7. Camera lenses of the first camera 42 and the second camera 43 can be disposed downwards, and camera lenses of the third camera 44 and the fourth camera 45 can be disposed towards the horizontal direction.

Further referring to FIG. 14, in some embodiments, the first illumination member 39 can include two first light bars 391 and two first supports 64 having a dovetail tenon. The two first supports 64 having the dovetail tenon can be disposed on the main working platform 17. The third camera 44 can be slidably disposed on one of the two first supports 64 having the dovetail tenon. The two first light bars 391 can be slidably disposed on the other one of the two first supports 64 having the dovetail tenon. Distances between centers of the two first supports 64 having the dovetail tenon and a center of the second working position 7 can be 210 mm. Bottoms of the two supports 64 having the dovetail tenon can be fixed to the main working platform 17 via the first fixed plate 641, and the two first supports 64 having the dovetail tenon can be slidably connected to the first fixed plate 641. A length direction of the main working platform is defined as a horizontal direction, and an angle between the first fixed plate 641 and the horizontal direction can be 35 degrees. The second illumination member 40 can include two second light bars 401 and two second supports 65 having a dovetail tenon. Distances between centers of the two second supports 65 having the dovetail tenon and a center of the fixed platform plate are 20 mm. The fourth camera 45 can be slidably disposed on one of the two second supports 65 having the dovetail tenon. The two second light bars 401 can be slidably disposed on the other one of the two second supports 65 having the dovetail tenon. Bottoms of the two second supports 65 having the dovetail tenon can be fixed to the fixed platform plate via the second fixed plate 651, and the two second supports 65 having the dovetail tenon can be slidably connected to the second fixed plate 651. A length direction of the main working platform is defined as a horizontal direction, and an angle between the second fixed plate 651 and the horizontal direction can be 30 degrees. The third support 66 having the dovetail can be disposed on the main working platform 17. A line defined by a center of the third support 66 having the dovetail tenon and a center of the second working position is parallel to the horizontal direction, and a distance between the center of the third support and the center of the second working position is 196 mm. The outer circle-shaped light 47, the second camera 43, the first camera 42, and the inner circle-shaped light 46 can be disposed on the third support 66 having a dovetail tenon from top to bottom. The outer circle-shaped light 47, the second camera 43, the first camera 42, and the inner circle-shaped light 46 can be capable of sliding along the third support 66 having a dovetail tenon.

In the present embodiment, the second visual module 16 can include a fourth illumination member 48, a fifth illumination member 49, a fifth camera 50, a sixth camera 51 and a seventh camera 52.

The fourth illumination member 48 can be disposed on a main working platform 17 at an external side of the fourth working position 9, and the fifth illumination member 49 can be disposed above the fourth working position 9. The fifth illumination member 49 can be a three-color light set including a first circle-shaped light 53, a second circle-shaped light 54 and a third circle-shaped light 55. The first circle-shaped light 53, the second circle-shaped light 54 and the third circle-shaped light 55 can be successively disposed in sequence from top to bottom. The first circle-shaped light 53, the second circle-shaped light 54 and the third circle-shaped light 55 can be hollow-shaped, and coaxially disposed from the inside out. Since the cameras can be disposed at different heights and materials of the test pieces 200 may be different, light having different colors and different heights can be applied.

The fifth camera 50 can be disposed at the external side of the fourth working position 9 and towards the fourth working position 9. The sixth camera 51 can be disposed at an internal side of the fourth working position 9 and towards the fourth working position 9. The seventh camera 52 can be disposed above a hollow portion of the first circle-shaped light 53 and towards the fourth working position 9. Camera lenses of the fifth camera 50 and the sixth camera 51 can be disposed towards the horizontal direction, and camera lenses of the seventh camera 52 can be disposed downwards.

In some embodiments, the fourth illumination member 48 can include two third light bars 481 and two fourth supports 67 having a dovetail tenon. The fifth camera 50 can be slidably disposed on one of the two fourth supports 67 having the dovetail tenon, and the two third light bars 481 can be slidably disposed on the other one of the two fourth supports 67 having the dovetail tenon. Bottoms of the two fourth supports 67 having the dovetail tenon can be fixed to the main working platform 17 the third fixed plate, and the two fourth supports 67 having the dovetail tenon can be slidably connected to the third fixed plate. An angle between the third fixed plate and the horizontal direction can be 40 degrees. The fifth support 68 having the dovetail can be disposed on the main working platform 17, and an angle between the fifth support 68 having a dovetail tenon and the horizontal direction can be 60 degrees. A distance between centers of the fifth supports 68 having the dovetail tenon and a center of the fourth working portion 9 can be 126 mm. The seventh camera 52 and the fifth illumination member 49 can be successively disposed along the fifth support 68 having a dovetail tenon from top to bottom, and slide along the fifth support 68 having a dovetail tenon. The sixth support 69 having a dovetail tenon can be disposed on the fixed platform plate 19. The sixth camera 51 can be disposed on the sixth support 69 having the dovetail tenon and slide along the sixth support 69 having the dovetail tenon. A distance between a center of the sixth support 69 having the dovetail tenon and a center of the fixed platform plate 19 can be 20 mm.

In the present embodiment, a length direction of the main working platform 17 in FIG. 4 is defined as a horizontal direction. An internal side of a working position is a side of the working position close to a center of the working platform; and an external side of the working position is a side of the working position away from the center of the working platform.

Figure 17:
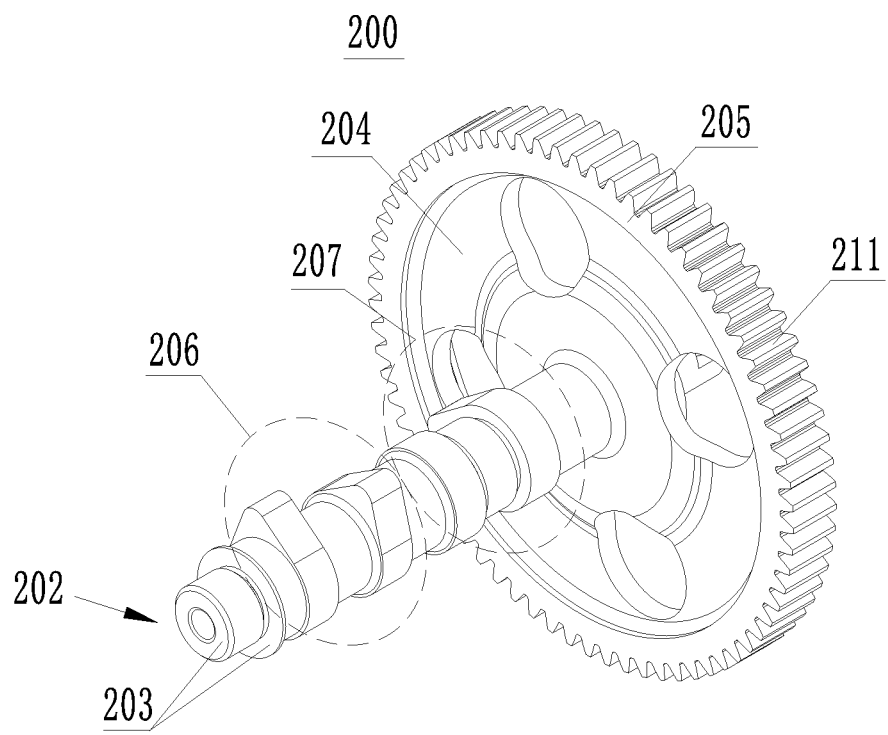
FIG. 17 is a schematic diagram of a test piece.
Figure 18:
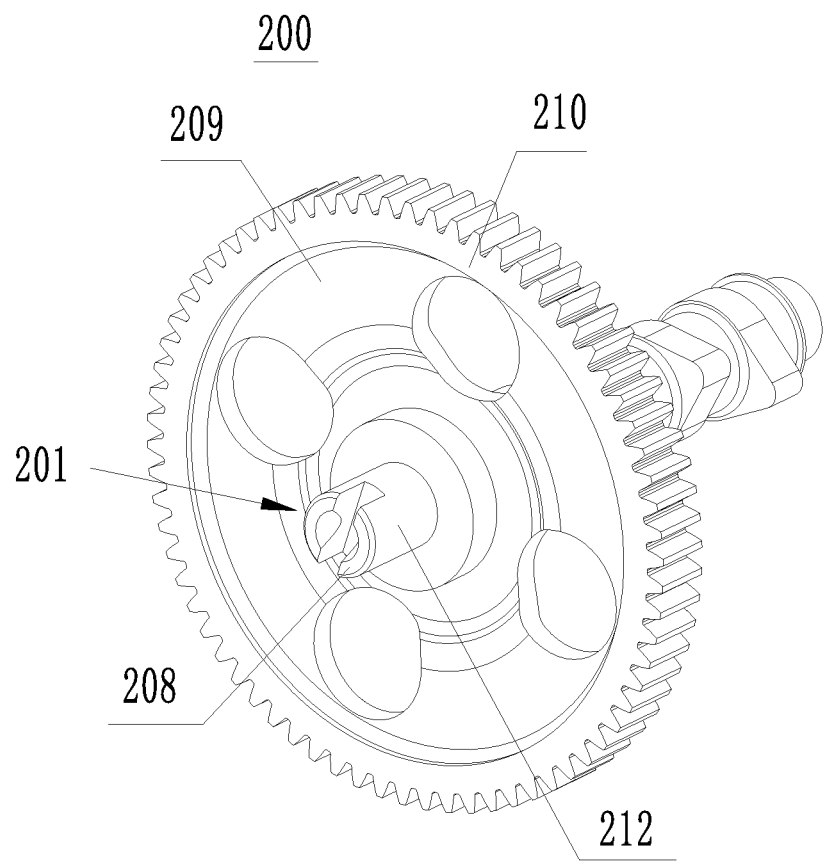
FIG. 18 is a schematic diagram of a test piece from another view angle.

Referring to FIG. 17, the automatic detecting device 100 for detecting flaws on a surface of a camshaft in the present embodiment can automatically detect the flaws on the surface of the camshaft. Structures of the camshaft can be totally detected, including detection on camshaft end surfaces (including a first end surface 203 and a second end surface 208), sand-casting surfaces (including first sand-casting surface 204 and a second sand-casting surface 209), side surfaces of tooth portion (including a first side surface of tooth portion 205 and a second side surface of tooth portion 210), cam surfaces (including a first cam surface 206 and a second cam surface 207), a tooth surface 211, and a side surface of keyway 212. And the detection device 100 has high degree of automation.

When the test piece 200 (a camshaft) is detected with the automatic detecting device for detecting flaws on a surface of a camshaft 100, methods for detecting the test piece 200 at the second working position 7 and the fourth working position 9 were shown in Table 1 herein.

TABLE 1

| Detecting area of the second working position 7 | Illuminant | Camera | collection module |
|---|---|---|---|
| First end surface 203 | inner circle-shaped light 46 | First camera 42 | dynamic collection |
| First sand-casting surface 204 | inner circle-shaped light 46, outer circle-shaped light 47 | Second camera 43 | static collection |
| first side surface of tooth portion 205 | outer circle-shaped light 47 | Second camera 43 | static collection |
| First cam surface 206 | First illumination member39, Second illumination member40 | Third camera 44 | static collection |
| Second cam surface 207 | First illumination member 39, Second illumination member 40 | Fourth camera 45 | static collection |
| Detecting area of the fourth working position 9 | Illuminant | Camera | collection module |
| Second end surface 208 | First circle-shaped light 53, Second circle-shaped light 54, Third circle-shaped light 55 | Seventh camera 52 | dynamic collection |
| Second sand-casting surface 209 | First circle-shaped light 53, Second circle-shaped light 54 | Seventh camera 52 | dynamic collection |
| Second side surface of tooth portion 210 tooth surface 211 | Second circle-shaped light 54 Fourth illumination member48 | Seventh camera 52 Fifth camera 50 | dynamic collection static collection |
| side surface of keyway 212 | First circle-shaped light 53, Third circle-shaped light 55 | Sixth camera 51 | static collection |

Embodiment 2

The present disclosure provides a detecting method with an automatic detecting device detecting flaws on a surface of a camshaft, which can include the following steps.

Step 1: defining a zero point of a rotating platform 11 on the basis of a first working position 6, a second working position 7, a third working position 8 or a fourth working position 9; placing a first test piece 200 on the first working position 6; and starting a closed-loop stepping motor 56 via an actuator to drive the rotating platform 11 to rotate 90 degrees clockwise according to feedback of a diffusion reflection sensor 23.

Step 2: rotating the rotating platform 11 to make the first test piece 200 rotate to a second working position 7, jacking the first test piece 200 at the second working position 7 with the first rotating elevator mechanism 4, shooting surface morphologies of the first test piece 200 placed at the second working position with a first visual module 15, and lowering the first rotating elevator mechanism 4.

In some embodiments, 360-degree panoramic images of a first end surface 203 of the camshaft, a first sand-casting surface 204, a first side surface of tooth portion 205, a first cam surface 206 and a second cam surface 207 can be successively obtained according to preset visual module actuation parameters of the second working position 7. The first camera 42 can shoot the first end surface 203; the second camera 43 can shoot the first sand-casting surface 204 and the first side surface of tooth portion 205; and the third camera 44 and the fourth camera 45 can shoot the first cam surface 206 and the second cam surface 207. Image collection can include dynamic image collection and static image collection. Static image collection can include: successively turning on corresponding illuminants, and actuating corresponding cameras. Dynamic image collection can include: turning on corresponding illuminants, actuating the stepping motor 29 to uniformly move at a preset speed to a preset angle, and actuating corresponding cameras according to preset angle interval. Relationships between the illuminants and the cameras at the second working position are shown in Table 1.

When the first test piece 200 is tested at the second working position 7, a second test piece 200 can be placed at the first working position 6.

Step 3: rotating the rotating platform 11 to make the first test piece 200 rotate to the third working position 8; jacking the first test piece 200 placed at the third working position 8 with the elevator mechanism 3; grabbing the first test piece 200 with the overturning mechanism 14, and lowering the elevator mechanism 3; overturning the first test piece 200 for 180 degrees with the overturning mechanism 14; rising the elevator mechanism 3 to contact with the first test piece 200, and releasing the overturning mechanism 14; and lowering the elevator mechanism 3 to lower the first test piece, and adversely overturning the overturning mechanism 14 for 180 degrees to return to the original state.

When the first test piece 200 is tested at the third working position 8, a second test piece 200 can be placed at the second working position 7, and a third test piece 200 can be placed at the first working position 6.

Step 4: rotating the rotating platform 11 to rotate the first test piece 200 to the fourth working position; jacking the first test piece 200 at the fourth working position 9 with the second rotating elevator mechanism 5; shooting surface morphologies of the first test piece 200 placed at the fourth working position 9 with the second visual module 16, and lowering the second rotating elevator mechanism 5.

In some embodiments, 360-degree panoramic images of a second end surface 208 of the camshaft, a second sand-casting surface 209, a second side surface of tooth portion 210, a tooth surface 211 and a side surface of keyway 212 can be successively obtained according to preset visual module actuation parameters of the fourth working position 9. The fifth camera 50 can shoot the tooth surface 211; the sixth camera 51 can shoot the side surface of keyway 212; and the seventh camera 52 can shoot the second end surface 208, the second sand-casting surface 209, and the second side surface of tooth portion 210. Image collection can include dynamic image collection and static image collection. Static image collection can include: successively turning on corresponding illuminants, and actuating corresponding cameras. Dynamic image collection can include: turning on corresponding illuminants, actuating the stepping motor 29 to uniformly move at a preset speed to a preset angle, and actuating corresponding cameras according to preset angle interval. Relationships between the illuminants and the cameras at the fourth working position are shown in Table 1.

When the first test piece 200 is tested at the fourth working position 9, a second test piece 200 can be placed and tested at the third working position 8, the third test piece 200 can be placed at the second working position 7, and a fourth test piece 200 can be placed at the first working position 6.

Step 5: rotating the rotating platform 11 to make the first test piece 200 rotate to the first working position 6, and taking the first test piece 200 down. Meanwhile, the second test piece 200 can be located at the fourth working position 9, the third test piece 200 can be located at the third working position 8, and the fourth test piece 200 can be located at the fourth working position.

The following test pieces 200 can be successively placed at the first working position 6, the second working position 7, the third working position 8 and the fourth working position 9, until all the test pieces are detected.

In the present embodiment, movement logic of the rotating platform 11 can be: at the first working position 6, it is to detect whether the feeding or laying-off is completed, or whether there is a test piece 200; when detection of test pieces 200 on each of the working positions is completed, the rotating platform 11 is driven to move 90 degrees until detection of all the test pieces 200 are completed.

The technical features of the above-described embodiments may be combined in any combination. For the sake of brevity of description, not all possible combinations of the technical features in the above embodiments are described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

We claim:

1. An automatic detecting device for detecting flaws on a surface of a camshaft, comprising:
a framework;
a working platform mounted on the framework,
wherein the working platform comprises a main working platform and a fixed platform, and the fixed platform comprises a fixed platform plate, a fixed platform support and a fixed platform baseboard connected in sequence from top to bottom, and the fixed platform plate is disposed above the main working platform; and
the main working platform is provided with a first working position, a second working position, a third working position and a fourth working position, and a first through hole, a second through hole, and a third through hole are disposed at the second working position, the third working position and the fourth working position of the main working platform of the main working platform, respectively,
a rotating platform rotatably connected to the working platform,
wherein the rotating platform is disposed between the fixed platform plate and the main working platform, the fixed platform support extends through a center hole of the rotating platform, and a gap is provided between the fixed platform support and an inner wall of the center hole; and,
a fourth through hole, a fifth through hole, a sixth through hole and a seventh through hole are provided at positions of the rotating platform corresponding to the second working position, the third working position, the fourth working position and the first working position, respectively;
a first rotating elevator mechanism disposed on the framework, wherein the first rotating elevator mechanism successively extends through the first through hole and the fourth through hole corresponding to the second working position, and is configured for elevating and rotating a test piece placed at the second working position;
a first visual module mounted on the working platform, which is configured for shooting surface morphologies of the test piece placed at the second working position;
wherein the first visual module comprises a first illumination member, a second illumination member, a third illumination member, a first camera, a second camera, a third camera and a fourth camera,
the first illumination member is disposed at an external side of the second working position, the second illumination member is disposed at an internal side of the second working position, the third illumination member is disposed above the second working position,
the third illumination member comprises an inner circle-shaped light and an outer circle-shaped light, the inner circle-shaped light and the outer circle-shaped light are coaxially disposed, the inner circle-shaped light is disposed inside the outer circle-shaped light, and a center point of the inner circle-shaped light and a center point of the fourth through hole are located along a first circumference;
the first camera is disposed above a hollow portion of the inner circle-shaped light and towards the second working position, the second camera is located above a gap between the inner circle-shaped light and the outer circle-shaped light and towards the second working position, the third camera is disposed at the external side of the second working position and towards the second working position, and the fourth camera is disposed at the internal side of the second working position and towards the second working position;
an elevator mechanism mounted on the framework, wherein the elevator mechanism successively extends through the second through hole and the fifth through hole corresponding to the third working position, and is configured to elevate a test piece placed at the third working position;
an overturning mechanism disposed on the working platform, wherein the overturning mechanism is configured for overturning the test piece placed at the third working position;
a second rotating elevator mechanism mounted on the framework, wherein the second rotating elevator mechanism successively extends through the third through hole and the sixth through hole corresponding to the fourth working position, and is configured to elevate and rotate a test piece placed at the fourth working position;

a second visual module disposed on the working platform and configured for shooting surface morphologies of the test piece placed at the fourth working position;
wherein the second visual module comprises a fourth illumination member, a fifth illumination member, a fifth camera, a sixth camera and a seventh camera;
the fourth illumination member is disposed at an external side of the fourth working position, the fifth illumination member is disposed above the fourth working position,
the fifth illumination member is a three-color light set comprising a first circle-shaped light, a second circle-shaped light and a third circle-shaped light, the first circle-shaped light, the second circle-shaped light and the third circle-shaped light are successively disposed in sequence from top to bottom, and the first circle-shaped light, the second circle-shaped light and the third circle-shaped light are coaxially disposed from the inside out,
the fifth camera is disposed at the external side of the fourth working position and towards the fourth working position, the sixth camera is disposed at an internal side of the fourth working position and towards the fourth working position, and the seventh camera is disposed above a hollow portion of the first circle-shaped light and towards the fourth working position; and
a plurality of locating members disposed on the rotating platform, and configured for placing the test piece.

2. The automatic detecting device of claim 1, wherein the main working portion is provided with a hollow rotating table and comprises a fixed portion and a rotating portion, the fixed platform baseboard is connected to the fixed portion of the hollow rotating table, the rotating platform is connected to the rotating portion of the hollow rotating table, and the rotating portion of the hollow rotating table is connected to a power output end of a closed-loop stepping motor.

3. The automatic detecting device of claim 1, wherein the first working position is provided with a diffuse reflection sensor at a center of the first working position, the diffusion reflection sensor is configured for detecting whether there is a test piece placed at the first working position,
the first through hole, the second through hole and the third through hole are disposed at a center of the second working position, a center of the third working position and a center of the fourth working position, respectively,
the center of the first working position, the center of the second working position, the center of the third working position and the center of the fourth working position are located along a second circumference, and the first working position, the second working position, the third working position and the fourth working position are disposed along the second circumference.

4. The automatic detecting device of claim 1, wherein the rotating platform is provided with an arc-shaped groove, the arc-shaped groove is provided with a bolt, the working platform is provided with an inductive sensor, a distance between the inductive sensor and a center of rotation of the rotating platform is defined as h1, an diameter of a third circumference in which the arc-shaped groove locates is defined as r1, and h1 is equal to r1.

5. The automatic detecting device of claim 1, wherein the elevator mechanism comprises a first lifting cylinder and a lifting support, a cylinder body of the first lifting cylinder is connected to the framework, a piston end of the first lifting cylinder is connected to a bottom end of the lifting support, and the lifting support is a hollow structure.

6. The automatic detecting device of claim 1, wherein both the first rotating elevator mechanism and the second rotating elevator mechanism comprise a second lifting cylinder, a stepping motor, a slider and a slide rail, respectively, a cylinder body of the second lifting cylinder is connected to the framework, a piston end of the second lifting cylinder is connected to a motor body of the stepping motor, the motor body of the stepping motor is connected to the slider, the slide rail is connected to the framework, and the slider is slidably connected to the slide rail;
a power output end of the stepping motor of the first rotating elevator mechanism is connected to a first autorotation support, and the first autorotation support is provided with a first locating hole; and
a power output end of the stepping motor of the second rotating elevator mechanism is connected to a second autorotation support, and the second autorotation support is provided with a second locating hole.

7. The automatic detecting device of claim 1, wherein the overturning mechanism comprises a rotary cylinder, a first cylinder, a first finger portion and a second finger portion, a cylinder body of the rotary cylinder is connected to the working platform, a rotary portion of the rotary cylinder is connected to a cylinder body of the first cylinder, and the first finger portion and the second finger portion are connected to two pistons of the first cylinder, respectively.

8. The automatic detecting device of claim 1, wherein the automatic detecting device further comprises a first fixed plate, the first illumination member comprises two first light bars and two first supports, the two first light bars are rectangle-shaped, the two first supports have a dovetail tenon, respectively, the two first supports are disposed on the main working platform, the third camera is slidably disposed on one of the two first supports, the two first light bars are slidably disposed on the other one of the two first supports, bottoms of the two supports are fixed to the main working platform via the first fixed plate, and the two first supports are slidably connected to the first fixed plate.

9. The automatic detecting device of claim 8, wherein distances between centers of the two first supports and a center of the second working position are 210 mm, and
a length direction of the main working platform is defined as a horizontal direction, an angle between the first fixed plate and the horizontal direction is 35 degrees.

10. The automatic detecting device of claim 1, wherein the automatic detecting device further comprises a second fixed plate, the second illumination member comprises two second light bars and two second supports, the two second light bars are rectangle-shaped, the two second supports have a dovetail tenon, respectively, the fourth camera is slidably disposed on one of the two second supports, the two second light bars are slidably disposed on the other one of the two second supports, bottoms of the two second supports are fixed to the fixed platform plate via the second fixed plate, and the two second supports are slidably connected to the second fixed plate.

11. The automatic detecting device of claim 10, wherein distances between centers of the two second supports and a center of the fixed platform plate are 20 mm, and
a length direction of the main working platform is defined as a horizontal direction, an angle defined by the second fixed plate and the horizontal direction is 30 degrees.

12. The automatic detecting device of claim 1, wherein the automatic detecting device further comprises a third support which has a dovetail tenon, the third support is disposed on the main working platform, and the outer circle-shaped light, the second camera, the first camera, and the inner circle-shaped light are disposed on the third support from top to bottom, and the outer circle-shaped light, the second camera, the first camera, and the inner circle-shaped light are capable of sliding along the third support.

13. The automatic detecting device of claim 12, wherein a length direction of the main working platform is defined as a horizontal direction, a line defined by a center of the third support and a center of the second working position is parallel to the horizontal direction, and a distance between the center of the third support and the second center of the second working position is 196 mm.

14. The automatic detecting device of claim 1, wherein the automatic detecting device further comprises a third fixed plate, the fourth illumination member comprises two third light bars and two fourth supports, the two third light bars are rectangle-shaped, the two fourth supports have a dovetail tenon, respectively, the fifth camera is slidably disposed on one of the two fourth supports, the two third light bars are slidably disposed on the other one of the two fourth supports, bottoms of the two fourth supports are fixed to the main working platform via the third fixed plate, and the two fourth supports are slidably connected to the third fixed plate.

15. The automatic detecting device of claim 14, wherein a length direction of the main working platform is defined as a horizontal direction, an angle between the third fixed plate and the horizontal direction is 40 degrees.

16. The automatic detecting device of claim 1, wherein the automatic detecting device further comprises a fifth support, which has a dovetail tenon, the fifth support is disposed on the main working platform, and the seventh camera and the firth illumination member are disposed on the fifth support from top to bottom, and the seventh camera and the firth illumination member are capable of sliding along the fifth support.

17. The automatic detecting device of claim 16, wherein a length direction of the main working platform is defined as a horizontal direction, an angle between the fifth support and the horizontal direction is 60 degrees.

18. The automatic detecting device of claim 16, wherein a distance between centers of the fifth support and a center of the fourth working portion is 126 mm.

19. The automatic detecting device of claim 1, wherein a sixth support is disposed on the fixed platform plate, the sixth support has a dovetail tenon, the sixth camera is disposed on the sixth support and capable of sliding along the sixth support.

20. The automatic detecting device of claim 19, wherein a distance between a center of the sixth support and a center of the fixed platform plate is 20 mm.

* * * * *